United States Patent Office 3,125,593
Patented Mar. 17, 1964

3,125,593
PROCESS FOR THE PRODUCTION OF VINYL ESTERS
Kenneth Raymond Hargrave, Kirkella, and Clive Gordon Gasser, Cottingham, England, assignors to The Distillers Company Limited, Edinburgh, Scotland
No Drawing. Filed Aug. 29, 1961, Ser. No. 134,565
Claims priority, application Great Britain Aug. 30, 1960
4 Claims. (Cl. 260—410.9)

The present invention relates to the production of vinyl esters of carboxylic acids from acetylene.

According to the present invention the process for the production of a vinyl ester of a higher carboxylic acid having at least five carbon atoms per molecule comprises heating a mixture of the higher carboxylic acid and a lower carboxylic acid with acetylene in the presence as catalyst of a zinc salt of a lower carboxylic acid.

The higher carboxylic acid may have from five to thirty carbon atoms per molecule and is preferably a saturated aliphatic acid such as valeric, caproic, caprylic, capric, lauric, myristic, palmitic or stearic acid or an aromatic acid such as benzoic acid. The lower carboxylic acid has less than five carbon atoms per molecule and is preferably acetic acid.

The mixture of the higher and lower carboxylic acid may be a solution of the higher acid in the lower acid. Conveniently the mixture contains between 10% and 50% by weight of the higher carboxylic acid.

The mixture of carboxylic acids is preferably heated with acetylene at a temperature from 150° to 350° C.; a temperature from 200° to 300° C. being particularly preferred.

The catalyst is conveniently deposited upon a support, which may be any conventional catalyst supporting material. The preferred catalyst is zinc acetate supported on active carbon.

The process may be carried out by feeding a liquid mixture of the higher carboxylic acid and lower carboxylic acid into a heated reactor packed with the catalyst and also passing acetylene into the reactor. The vinyl ester produced may be separated from the reaction product, for example by distillation. The process may be carried out batchwise or continuously with recycle of unconverted reactants.

The acetylene feed to the reactor may, if desired, contain an inert diluent such as nitrogen. In certain cases a considerable amount of heat is generated in the reactor when the present invention is carried out using undiluted acetylene, and it may thus be advantageous to dilute the acetylene feed with an inert gas, at least during the early stages of the reaction.

The following examples further illustrate the invention.

EXAMPLES 1 TO 7

Into a reactor packed with a catalyst consisting of zinc acetate supported on activated carbon were passed acetylene and a solution of lauric acid in acetic acid. The reactor was heated by a bath maintained at 200° to 255° C., the temperature being adjusted within this range to give optimal conversion of acetylene. The liquid feed ratio (volume of liquid feed per hour per unit volume of catalyst) was 0.125 and the acetylene space velocity was 200 reciprocal hours. A mixture of vinyl acetate and vinyl laurate was produced and the esters were separated by fractional distillation.

The composition of the catalyst was 33% w./w. zinc acetate on carbon in Examples 1, 2 and 4 to 7 inclusive, and 10% w./w. in Example 3. The reaction conditions and quantities of the esters produced are given in Table 1.

*Table 1*

| Example | Lauric acid in acetic acid, percent w./w. | Bath temperature (° C.) | Molar conversion, percent | | Catalyst life (hours) |
|---|---|---|---|---|---|
| | | | Lauric acid to vinyl laurate | Acetic acid to vinyl acetate | |
| 1 | 50 | 225-225 | 28 | 7 | 60. |
| 2 | 50 | 230-255 | 53 | 9 | 30. |
| 3 | 40 | 225 | 48 | 3 | 50. |
| 4 | 35 | 225-250 | 70 | 16 | 150. |
| 5 | 35 | 240-255 | 95 | 11 | at least 210. |
| 6 | 20 | 230-255 | 93 | 45 | at least 70. |
| 7 | 10 | 225 | 98 | 42 | at least 107. |

In contrast with the above examples if a solution of 25% by weight of lauric acid in toluene were used instead of the lauric acid solution in acetic acid, the reaction conditions being otherwise the same, blockage of the reactor occurred within 2 hours.

EXAMPLES 8 TO 13

The procedure described for Examples 1 to 7 was carried out using mixtures of caprylic acid in acetic acid; the results are shown in Table 2. In each case, the catalyst was 33% zinc acetate on activated carbon. In Examples 8 to 11, the bath temperature was varied to vary the ratio of ester produced. No blockage occurred in the reactor.

*Table 2*

| Example | Caprylic acid in acetic acid, percent w./w. | Bath temperature (° C.) | Molar conversion, percent | | Catalyst life (hours) |
|---|---|---|---|---|---|
| | | | Acetic acid to vinyl acetate | Caprylic acid to vinyl caprylate | |
| 8 | 10 | 210 | 44 | 98 | at least 280. |
| 9 | 10 | 220 | 50 | 97 | at least 50. |
| 10 | 10 | 230 | 56 | 95 | at least 60. |
| 11 | 10 | 235 | 47 | 78 | at least 170. |
| 12 | 17 | 235 | 38 | 70 | at least 90. |
| 13 | 25 | 235 | 24 | 60 | at least 120. |

EXAMPLE 14

The procedure described for Examples 1 to 7 was followed, using 20% w./w. benzoic acid in acetic acid. The catalyst was 33% w./w. zinc acetate on active carbon and the bath temperature was maintained between 255° and 260° C. The liquid feed ratio as defined above was 0.5 and the acetylene space velocity was 400 reciprocal hours.

The molar conversion of benzoic acid to vinyl benzoate was 82%, and of acetic acid to vinyl acetate 17%. Catalyst activity was still high after 70 hours.

It will be understood that similar results are obtained if, in the foregoing examples, the zinc acetate is replaced by another zinc salt within the scope of this invention, as for instance by zinc propionate, zinc butyrate, zinc isobutyrate, etc. Similarly, the higher carboxylic acids exemplified in the illustrative examples may be replaced by any one of the higher carboxylic acids hereinbefore enumerated.

We claim:

1. Process for the production of vinyl ester of carboxylic acid having from 5 to 30 carbon atoms which consists of contacting at a temperature between 150 and 300° C. a liquid phase mixture consisting essentially of said carboxylic acid and acetic acid with acetylene in the presence as catalyst of a zinc salt of a carboxylic acid having less than 5 carbon atoms.

2. The process as claimed in claim 1 in which the mixture of carboxylic acids contains between 10% and 50% by weight of the higher carboxylic acid.

3. The process as claimed in claim 1 in which the temperature is in the range 200° to 300° C.

4. The process as claimed in claim 1 in which the catalyst is zinc acetate deposited on active carbon.

References Cited in the file of this patent

UNITED STATES PATENTS

| 2,066,075 | Reppe | Dec. 29, 1936 |
| 2,472,086 | Beller | June 7, 1949 |
| 2,750,410 | Hanzen et al. | June 12, 1956 |